April 14, 1964 E. A. WHITE ETAL 3,129,058
METHOD FOR PREPARING POTASSIUM SULFIDE
Filed Oct. 25, 1960
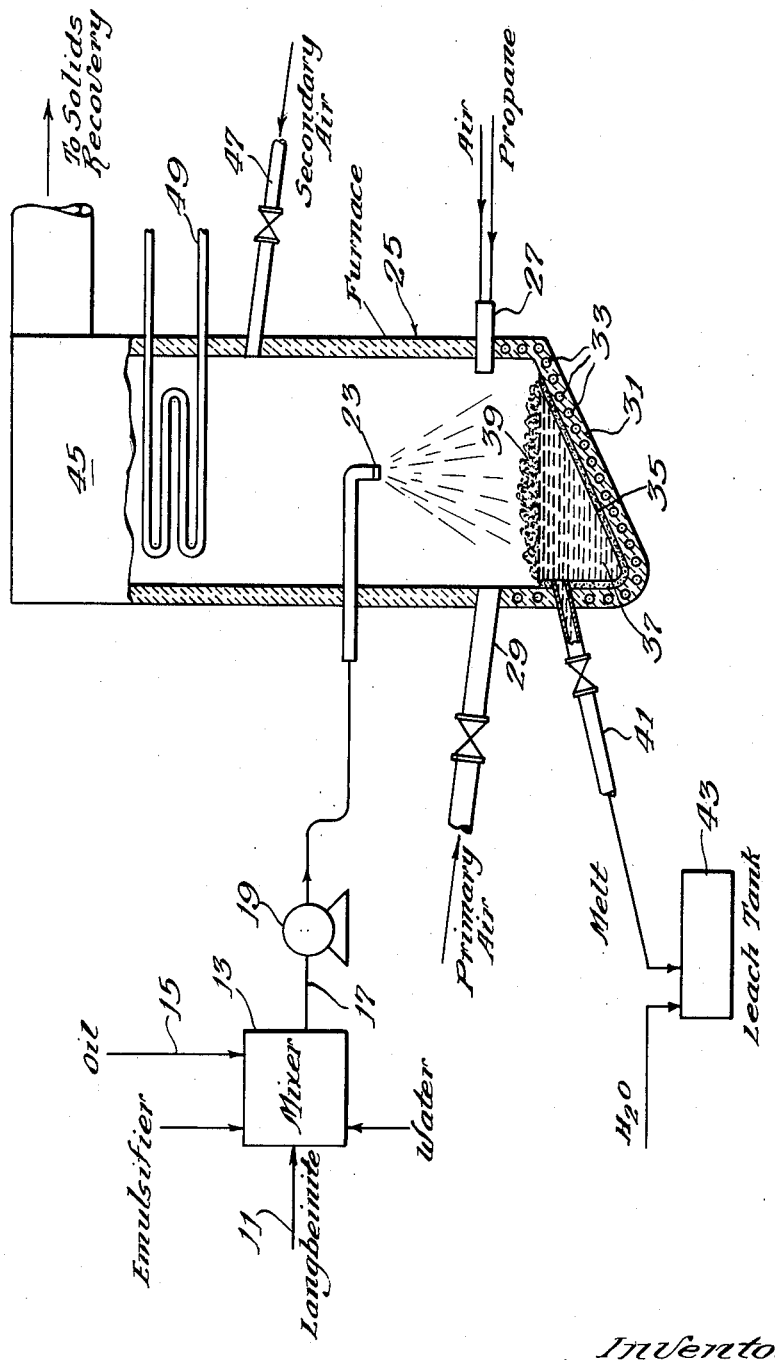
Inventors:
Edward A. White
Oscar L. Norman
By:
Attorney:

United States Patent Office 3,129,058
Patented Apr. 14, 1964

3,129,058
METHOD FOR PREPARING POTASSIUM SULFIDE
Edward A. White, Glenview, and Oscar L. Norman, Northbrook, Ill., assignors to International Minerals & Chemical Corporation, a corporation of New York
Filed Oct. 25, 1960, Ser. No. 64,930
11 Claims. (Cl. 23—137)

The present invention generally relates to the treatment of potassium sulfate salts. It more particularly relates to a method of reducing a potassium sulfate salt to form potassium sulfide. Potassium sulfate ($K_2SO_4$) occurs by itself in ores and salts, such as arcanite, and as salts with magnesium sulfate in such ores as langbeinite ($2MgSO_4 \cdot K_2SO_4$), leonite ($MgSO_4 \cdot K_2SO_4 \cdot 4H_2O$), and schoenite ($MgSO_4 \cdot K_2SO_4 \cdot 6H_2O$). Potassium sulfate containing salts are used extensively, especially as a component of fertilizers. However, since these potassium sulfate-containing salts are relatively inexpensive, various processes have been developed to convert these salts into other more valuable compounds. Several of the prior art processes deal with the reduction of potassium sulfate-containing salts to form potassium sulfide. United States Patent No. 2,837,403, issued to Gunter H. Gloss and William J. McGinnnis, describes a process which is illustrative of the prior art processes. Potassium sulfide, itself, finds use as a laboratory reagent and as a depilatory, and several prior art processes use potassium sulfide as a starting material for producing potassium carbonate. United States Patent No. 2,837,403 also describes such a process.

The prior art processes for the reduction of potassium sulfate to potassium sulfide generally include admixing the potassium sulfate-containing salt with solid carbon, followed by heating in a strongly reducing atmosphere. The temperatures during the reduction were carfeully controlled to avoid the formation of a molten mass. None of the prior art methods, however, has achieved significant commercial acceptance. The present invention is directed to a novel method of preparing potassium sulfide from potassium sulfate-containing material, which novel method is commercially attractive.

Accordingly, it is an object of the present invention to provide a novel method of treating a potassium sulfate-containing material to form potassium sulfide.

It is a further object of the invention to provide a novel method of reducing a potassium sulfate salt to potassium sulfide, which novel method includes producing a molten mass containing potassium sulfide.

It is another object to provide a commercially attractive method of reducing a potassium sulfate salt to potassium sulfide, using a potassium sulfate salt and a liquid hydrocarbon as starting materials.

It is an additional object of the invention to provide a novel method of reducing a potassium sulfate salt to potassium sulfide, which novel method may be effected in commercially available equipment.

These and other objects and advantages of the present invention will be apparent from the description of the invention.

Generally described, the present invention is a method of preparing potassium sulfide from potassium sulfate-containing material which comprises admixing a potassium sulfate-containing material with a carbonaceous material, introducing the admixture into a combustion zone, introducing air into said combustion zone in an amount insufficient to complete combustion of said carbonaceous material, effecting combustion in said combustion zone to achieve a temperature above about 1600° F. to obtain a molten product phase, and removing a molten product phase containing potassium sulfide from said combustion zone.

In order to more fully appreciate the present invention with its many advantages, reference may be made to the accompanying drawing which illustrates a process in accordance with the present invention and an apparatus preferred for use in the process. The drawing is given to illustrate the instant novel process and is not to be construed as limiting the invention thereto.

In the novel process of this invention, a potassium sulfate-containing material is admixed with a carbonaceous material. The potassium sulfate-containing material may be in solid or liquid form, such as a solution; however, the starting material is preferably in a solid form such as solid potassium sulfate, langbeinite, leonite, and/or schoenite. Mixtures of two or more of these potassium sulfate-containing materials may, of course, also be used. In the processes of the prior art in which the solid potassium sulfate-containing material is mixed with a solid carbonaceous material, the potassium sulfate material is preferably in a very finely divided form, for example —50 mesh. In the process of the present invention, finely divided potassium sulfate-containing material is also preferred, however, larger size particles may also be efficiently treated in the present process. In one embodiment of the invention, before an admixture of potassium sulfate-containing material and a hydrocarbonaceous material is introduced into the combustion zone, the hydrocarbonaceous material is in a liquid state, and is, therefore, able to penetrate into the solid particles. However, in general, it is preferred that the solid particles be substantially all of —4 mesh size (Tyler Series).

Any suitable carbonaceous material may be used in the process of the present invention. Coke, wood charcoal, petroleum coke, etc. are suitable. Hydrocarbonaceous material is preferred and it is still more preferred that the hydrocarbonaceous material be liquid at ambient temperatures. Petroleum hydrocarbon fractions are preferred, especially the gas-oil and higher boiling fractions. In general, petroleum hydrocarbon fractions are of relatively low cost and they produce good results. While a hydrocarbon which is liquid at ambient conditions is preferred since it facilitates handling, a hydrocarbon that is only semi-fluid or solid at ambient conditions may be used, provided that it is a fluid at elevated tempertaures below the combustion zone temperature. When the semi-fluid or solid hydrocarbonaceous materials are used, it is, however, preferably to heat the hydrocarbon to a temperature at which it is in the liquid state before admixing with the potassium sulfate-containing material, or the material may be admixed while they are in solid form and the admixture may be heated to a temperature where the hydrocarbon is in the liquid state. The admixture of potassium sulfate and carbonaceous material may be wetted with an aqueous medium, such as water or a recycled aqueous solution, to form a pasty mass which may be extruded, pelleted, formed into balls, etc. When a liquid hydrocarbon and an aqueous medium are used, an emulsifier may also be added to the admixture.

In any event, a mixture of potassium sulfate-containing material and a carbonaceous material is eventually formed before introducing the admixture into the combustion zone.

In a preferred method of operating the process of the invention, the admixture of potassium sulfate-containing material and liquid hydrocarbon is heated to a temperature above the coking temperature of the hydrocarbon at the pressure in the combustion zone, however, the admixture is maintained under a pressure greater than that in the combustion zone and sufficiently high to prevent substantial coking during heating. When this heated admixture is introduced into the combustion zone, which is at a lower pressure, coking of the hydrocarbon occurs, that is it decomposes and coke forms in the combustion zone.

In accordance with the present invention, the admixture of carbonaceous material and potassium sulfate-containing material is introduced into a combustion zone wherein combustion of the carbonaceous material is effected. The admixture may be introduced into the combustion zone in any suitable manner. It may be sprayed, poured, dumped, etc. into the combustion zone. In the preferred embodiment of the invention wherein coking of the hydrocarbon takes place when the admixture is introduced into the combustion zone, the combustion of the decomposition products is effected. The combustion in the primary combustion zone is controlled so that combustion is incomplete, that is, air is supplied to the primary combustion zone in an amount insufficient to complete combustion. During the combustion in the primary combustion zone, overall reducing conditions, therefore, exist and the potassium sulfate in the sulfate-containing material is reduced to potassium sulfide.

The relative amounts of potassium sulfate-containing material, carbonaceous material, and air are predetermined to achieve reducing conditions in the primary combustion zone and a temperature above about 1600° F., preferably within the range of from about 1600° F. to about 2500° F., and more preferably within the range of from about 1800° F. to about 2100° F. At temperatures below 1600° F., the potassium sulfate is not effectively reduced to the sulfide. The carbon is present in an excess of that stoichiometrically required to reduce the potassium sulfate to potassium sulfide. It is preferred that the mole ratio of $C/K_2SO_4$ be at least 2:1, and more preferably at least 4:1. A ratio of at least 2:1 is preferred since it has been determined that at these ratios and when operating with reducing conditions in the primary combustion zone, a solid char forms that floats on and covers the molten pool of product. As more molten product is formed in the combustion zone, the melt passes through the char and adds to the molten mass. The floating char effectively prevents any oxidation of the $K_2S$ in the molten mass back to $K_2SO_4$. The conditions in the primary combustion zone therefore need not be as strongly reducing as in the prior art processes. This is an important feature of the invention which contributes to the success of the process.

The heating to temperatures above 1600° F. to effect reduction of the potassium sulfate to potassium sulfide may be conducted in any conventional reducing furnace. Preferably, however, the reaction is carried out in a direct-fired furnace operated with a reducing flame. A direct-fired rotary furnace or kiln or a direct-fired multiple hearth furnace may be used. A so-called black liquor furnace as is conventionally used in the paper industry is a specifically preferred type of furnace. Such black liquor furnaces are commercially available. When the reduction process is carried out in a direct-fired furnace, it is necessary to use a reducing flame.

The reaction is carried out at a sufficiently high temperature to achieve a liquid product phase in the reaction vessel. Prior art process avoided the formation of a liquid product phase. One reason that the liquid phase was avoided by the prior processes is that molten potassium sulfide is very corrosive to most metals and this presented a serious operational problem. It has now, however, been determined that when the hearth or collection zone in the reaction vessel is suitably cooled to form a solid potassium sulfide lining, the corrosion is substantially reduced. This feature is hereinafter further discussed.

The reduction reaction results in the production of a number of gaseous products, such as carbon monoxide, hydrogen, methane, etc. These gases may readily be further oxidized with the production of further heat. In the prior art processes, these gases were collected and treated for the recovery of sulfur therefrom in accordance with standard practices of the art. In the process of the present invention, these gases are preferably subjected to combustion in a secondary combustion zone. The secondary combustion zone is preferably within the same reaction vessel as the primary combustion zone. The heated gases from the secondary combustion zone may be conducted to a heat recovery unit such as a conventional waste heat boiler in which the heat in the gases is efficiently recovered by conversion to steam. The secondary combustion zone is above the primary combustion zone and combustion of the gases from the primary combustion zone is preferably conducted with excess air. The temperatures in the secondary reaction zone are usually within the range of from about 2300° F. to about 2800° F. When operating in accordance with the present invention, it has been determined that the secondary combustion zone may be in the same reaction vessel as the primary combustion zone. In the prior art processes in which a liquid or molten phase of potassium sulfide was not attained, only strongly reducing conditions were maintained in the reaction vessel. However, in the process of the present invention where a molten product phase is produced, it has been found possible to effect substantially complete oxidation of the gaseous products in the same reaction vsesel.

The molten reaction product contains potassium sulfide and potassium sulfate, and when the reaction mixture contains magnesium sulfate as well as potassium sulfate, the reaction product contains magnesium oxide. The reaction product also usually contains small amounts of potassium sulfite, potassium thiosulfate, and other compounds of oxygen, potassium and sulfur. The molten reaction product may be cooled or may be water quenched and the water soluble constituents removed therefrom. The amount of water utilized is sufficient to dissolve substantially all of the potassium salts present. The solids may be removed from the solution by any suitable means such as filtration, centrifuging, etc. The potassium sulfide may be recovered from the solution by any suitable method, or the solution may be carbonated to convert the potassium sulfide to potassium bicarbonate and/or potassium carbonate. The separation of the potassium carbonate or bicarbonate from the solution may be effected in any suitable manner for example by the method described in U.S. Patent No. 2,837,403.

Having generally described the process of the invention, a more specific and detailed description will be given with reference to the accompanying drawing which is a schematic drawing illustrating the general application of the process of the invention. The drawing is intended merely as an illustration and not as a limitation of the instant invention. Modifications of the process illustrated in the drawing, while employing the principles of the invention, will be apparent to those skilled in the art.

Referring to the drawing, a langbeinite concentrate is introduced via line 11 into a mixer 13. A fuel oil is introduced into the mixer 13 through line 15. Water and an emulsifier are also introduced into the mixer. The starting materials are added in ratios to produce a flowable slurry. The slurry is withdrawn from mixer 13 through a suction line 17 of a pump 19. The pump 19 pumps the slurry through a spray nozzle 23 which directs a spray of the slurry downwardly into a central portion of a furnace 25. The diameter of the furnace is 9 inches and the height is approximately 5 feet. In a furnace of such relatively small size, the heat losses are relatively large. The furnace is, therefore, equipped with a small Maxon-Premix burner 27 which burns a propane-air mixutre. Primary air may also be introduced into the furnace 25 through air inlet pipe 29. The amount of air introduced through the burner 27 and pipe 29 are controlled so that overall reducing conditions are maintained below the nozzle 23. The area below the nozzle is a primary combustion zone and the combustion of the oil and propane raises the temperature in the combustion zone to about 2000°. The furnace 25 has the lower section lined with a suitable refractory 31. Water cooling tubes 33 are positioned in the refractory to cool the refractory and forms a layer of solid product 35 about the refractory. At the 2000° F. reduction temperature, a molten reaction product 37 is formed and collects in the lower portion of the furnace.

Since overall reducing conditions are maintained in the primary combustion zone, the fuel oil is not completely oxidized and a char 39 forms in the furnace 25. The char 39 floats on the molten product and in effect shields the molten mass from any oxidation. The reducing conditions in the primary combustion zone, therefore, need not be as closely regulated as is necessary in prior art processes. Further, as hereinbefore set forth, molten potassium sulfide is highly corrosive; however, by cooling the refractory to a degree that a layer of solid product 35 is formed on the cooled refractory 31, the molten mass does not come into contact with the refractory and the corrosion problems are, therefore, substanitally reduced.

The molten product containing potassium sulfide, potassium sulfate, etc. is withdrawn from furnace 25 through outlet conduit 41. The molten product may be quenched by pouring it into a leach tank 43. Sufficient water is added to dissolve substantially all of the potassium sulfate, potassium sulfide, and other potassium compounds, but the magnesium oxide component being insoluble in water will remain undissolved. The potassium sulfide may be recovered as hereinbefore set forth.

The gases from the primary combustion zone below spray nozzle 23 pass upwardly in the furnace into the secondary combustion zone 45. Secondary air is introduced into the secondary combustion zone through conduit 47. The secondary air is preferably provided in excess to complete combustion of the gases. The combustion of the gases in the secondary combustion zone increases the temperature of the gases. This heat may be recovered by passing the hot gases through a waste heat boiler 49. The gases from the waste heat boiler may be water scrubbed in a Venturi or other suitable type of equipment (not shown) for the recovery of solids and further recovery of heat.

In order to give a fuller understanding of the invention, but with no intention to be limited thereto, the following specific examples are given.

Example I

Fnely ground wood charcoal and —10 mesh potassium sulfate were admixed at a mole ratio of $C/K_2So_4$ of 6:1. The admixture was mixed with sufficient water to give a pasty mass which was then formed into spheres. The spheres were then dried.

A laboratory scale black liquor furnace of substantially the same size and slope described above and illustrated in the drawing was preheated to approximately 2000 F. The Maxon-Premix burner was then adjusted so as to maintain a very small pilot light. Approximately 8½ pounds of the dried carbon-potassium sulfate balls were then dropped into the furnace. Primary air was introduced into the primary combustion zone of the furnace at a rate insufficient to complete combustion of the carbon. Combustion of carbon in the primary combustion zone maintained the furnace temperature at about 2000° F.

After a few minutes operation a pool of molten material formed in the bottom of the furnace. A layer of char floated on top of the molten material. A sample of the molten material was withdrawn from the furnace and quenched in water.

An analysis of the resultant solution showed a high percentage of $K_2S$ and showed that at the conditions in the black liquor furnace 90% of the potassium sulfate in the charge was reduced.

Example II

The procedure of Example I was repeated except that the spheres charged where a mixture of potassium sulfate and Bunker C fuel oil. The spheres also had a 6:1 mol ratio of $C/K_2SO_4$. The temperature in the furnace in this run was somewhat lower than in the run of Example I, generally being within the range of from 1800° F. to 2000° F. The analysis of the product showed that 52% of the potassium sulfate in the charge was reduced.

The description of the invention utilized specific reference to certain process details; however, it is to be understood that such details are illustrative only and not by way of limitation. Other modifications and equivalents of the invention will be apparent to those skilled in the art from the foregoing description.

We claim:
1. A method of preparing potassium sulfide from potassium sulfate-containing material which comprises forming a homogeneous mixture of a potassium sulfate-containing material and a liquid hydrocarbon material in proportion to provide a $C:K_2SO_4$ mole ratio of at least 2:1; introducing said mixture into the primary combustion zone of a reaction vessel having a lower primary combustion zone and an upper secondary combustion zone; introducing primary air into said primary combustion zone in an amount insufficient to complete combustion of said liquid hydrocarbon material; effecting combustion in said primary combustion zone to obtain a temperature therein above about 1600° F. to produce gaseous products, a lower molten phase containing potassium sulfide products and an upper char phase floating on said molten phase; admixing secondary air with said gaseous combustion products to effect combustion thereof in a secondary combustion zone above said primary combustion zone; and recovering molten phase product containing potassium sulfide from said primary combustion zone.

2. A method according to claim 1 which comprises the additional step of forming a solid layer of potassium sulfide in the lower portion of said primary combustion zone for containment of said molten phase product.

3. A method according to claim 1 wherein the $C:K_2SO_4$ mole ratio is at least 4:1.

4. A method according to claim 1 wherein the temperature obtained in said primary combustion zone is in the range between about 1600° F. and about 2500° F.

5. A method according to claim 1 wherein said potassium sulfate-containing mixture comprises langbeinite.

6. A method for preparing potassium sulfide from potassium-sulfate containing material which comprises forming a homogeneous mixture of a potassium-sulfate containing material and a carbonaceous material in proportion to provide a $C:K_2SO_4$ mole ratio of at least 2:1; introducing said mixture into the primary combustion zone of a reaction vessel having a lower primary combustion zone and an upper secondary combustion zone; introducing primary air into said primary combustion zone in an amount insufficient to complete combustion of said carbonaceous material; effecting combustion in said primary combustion zone to obtain a temperature therein above about 1600° F. to produce gaseous products, a lower molten phase containing potassium sulfide products, and an upper char phase floating on said molten phase; forming a solid layer of potassium sulfide in the lower portion of said primary combustion zone for containment of said molten product; admixing secondary layer with said gaseous combustion products to effect combustion thereof in a secondary combustion zone above said primary combustion zone; and recovering molten phase products containing potassium sulfide from said primary combustion zone.

7. A method according to claim 6 wherein the temperature in said primary combustion zone is in the range between about 1600° F. and 2500° F.

8. A method according to claim 6 wherein the temperature in said primary combustion zone is in a range between about 1800° F. and about 2100° F.

9. A method according to claim 6 wherein said carbonaceous material is a liquid hydrocarbon.

10. A method according to claim 6 wherein the C:$K_2SO_4$ mole ratio is at least about 4:1.

11. A method according to claim 6 wherein said potassium sulfate-containing material comprises langbeinite.

References Cited in the file of this patent

UNITED STATES PATENTS

| | | |
|---|---|---|
| 1,447,524 | Stantial et al. | Mar. 6, 1923 |
| 1,636,106 | Naef | July 19, 1927 |
| 1,640,315 | Freeman | Aug. 23, 1927 |
| 1,931,536 | Goodell | Oct. 21, 1933 |
| 2,837,403 | Gloss et al. | June 3, 1958 |